United States Patent [19]
Takeda et al.

[11] Patent Number: 5,313,384
[45] Date of Patent: May 17, 1994

[54] HIGH VOLTAGE GENERATING CIRCUITS INCLUDING A TRANSFORMERLESS VOLTAGE MULTIPLIER

[75] Inventors: Kazuro Takeda; Katsuhiro Ishimura, both of Tokyo, Japan

[73] Assignee: Oki Electric Industry Co., Ltd., Tokyo, Japan

[21] Appl. No.: 887,833

[22] Filed: May 26, 1992

[30] Foreign Application Priority Data

May 30, 1991 [JP] Japan .................................. 3-127592

[51] Int. Cl.$^5$ ............................................ H02M 7/10
[52] U.S. Cl. .................................. 363/60; 331/DIG. 3; 363/61
[58] Field of Search ............... 363/59, 60, 61; 331/57, 331/135, 45, DIG. 3; H02M 7/10, 3/07

[56] References Cited

U.S. PATENT DOCUMENTS

| | | | |
|---|---|---|---|
| 3,869,659 | 3/1975 | Doong et al. | 324/32 |
| 3,911,292 | 10/1975 | Petrick et al. | 307/235 |
| 4,028,596 | 6/1977 | Weber | 361/235 |
| 4,092,712 | 5/1978 | Harrigill, Jr. et al. | 363/60 |
| 4,236,199 | 11/1980 | Stewart | 363/60 |
| 4,292,592 | 9/1981 | Birdwell et al. | 328/233 |
| 4,621,315 | 11/1986 | Vaughn et al. | 363/60 |
| 4,908,752 | 3/1990 | Suzuki et al. | 363/17 |
| 4,992,922 | 2/1991 | Ishimura et al. | 363/59 |

FOREIGN PATENT DOCUMENTS

| | | |
|---|---|---|
| 2244294 | 4/1975 | France . |
| 55-162278 | 12/1980 | Japan . |
| 81974 | 4/1987 | Japan . |
| 179263 | 7/1990 | Japan . |

OTHER PUBLICATIONS

Van Der Geer, "Transformerless D-C Voltage Converter is 70% Efficient", Electronics, p. 95, Apr. 14, 1969.
Poulsen, "DC/DC Voltage Multiplier", Practical Electronics, vol. 15, No. 12, p. 74, Dec. 1979.
Shepherd, "Oscillator Starts in a Defined Mode", Electronic Eng. (G.B.), vol. 51, No. 624, p. 31, Jun. 1979.
Radio Fernsehen Elektronik, Berlin 34, Apr. 1985, No. 4, Ost-Berlin, DDR, pp. 263–264.
"The Mosmarx voltage multiplier" Donaldson, Electronics & Wireless World, Aug. 1988, No. 1630, pp. 748–750.

*Primary Examiner*—William H. Beha, Jr.
*Attorney, Agent, or Firm*—Spencer, Frank & Schneider

[57] ABSTRACT

A high-voltage generating circuit suitable for a light receiving circuit includes a pulse oscillating circuit, a current drive circuit, a first capacitor, a second capacitor, a Cockcroft-Walton circuit, a low-pass filter. The pulse oscillating circuit produces a train of repetitive pulses. The current drive circuit produces a train of repetitive pulses which are in phase opposite to the train of repetitive pulses. The first capacitor couples the current drive circuit with the first input terminal of the Cockcroft-Walton circuit. The second capacitor couples the pulse oscillating circuit with the second input terminal of the Cockcroft-Walton circuit. The Cockcroft-Walton circuit boost the pulse voltage applied between the first and second inputs to produce a high direct current voltage. The low-pass filter removes the ripple components of the high direct current voltage. The Cockcroft-Walton circuit can be formed with a small number of circuit components.

6 Claims, 2 Drawing Sheets

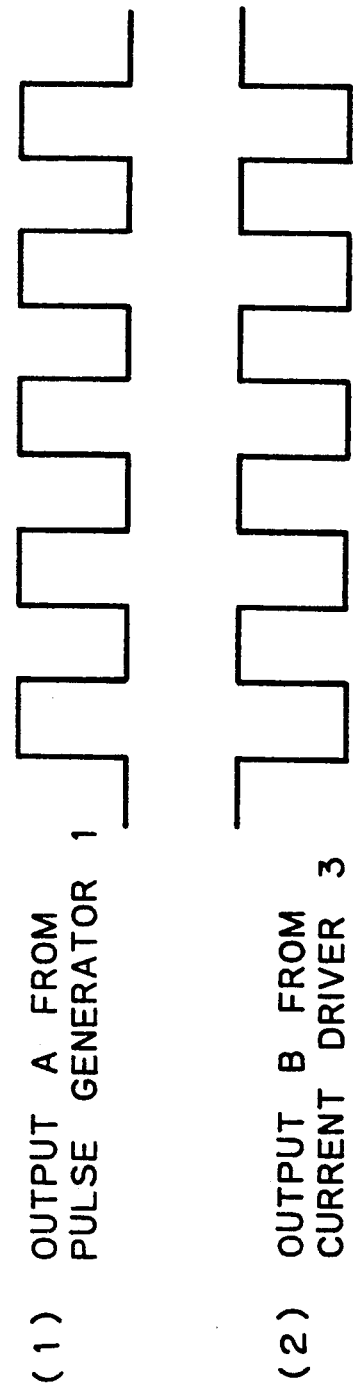

HIGH VOLTAGE GENERATING CIRCUITS INCLUDING A TRANSFORMERLESS VOLTAGE MULTIPLIER

BACKGROUND OF THE INVENTION

The present invention relates to a high-voltage generating circuit suitable for a light receiving circuit used in an optical transmission device.

DESCRIPTION OF THE RELATED ART

Some light receiving circuits used in an optical transmission device include avalanche-type photo diodes which act as light receiving elements. This kind of avalanche-type photo diode requires a high-voltage generating circuit to produce a high direct-current voltage, for example, 80 to 120 volts, to cause the electron multiplying function inside the avalanche-type photo diode.

Since the prior art high-voltage generating circuit employs a transformer, it has been difficult to flatten the printed circuit board mounting a light receiving circuit.

In order to overcome such a problem, the present applicant filed, on Jan. 18, 1989 U.S. Patent application No. 07/392,293, (now U.S. Pat. No. 4,992,922), which discloses a high-voltage generating circuit employing a Cockcroft-Walton circuit instead of the transformer.

U.S. Pat. No. 4,992,922 describes an example of a light receiving circuit including an avalanche-type photo diode. The light receiving circuit described in the above U.S. Patent also uses a high voltage generating circuit with a Cockcroft-Walton circuit which can operate on the same power supply as that for the pulse generating circuit.

However, it has been desired to reduce the number of circuit components of the above-mentioned high-voltage generating circuit to realize more miniaturization and simplification of the light receiving circuit.

SUMMARY OF THE INVENTION

One object of the invention is to provide a high-voltage generating circuit which can be formed of a small number of circuit components.

Another object of the invention is to provide a high-voltage generating circuit which includes a Cockcroft-Walton circuit having a reduced number of voltage boosting stages.

A high-voltage generating circuit according to the present invention comprises a pulse generating circuit for producing a train of repetitive pulses; a current drive circuit for amplifying a train of repetitive pulses which are opposite to the train of repetitive pulses from the pulse generating circuit; a first capacitor connected to the pulse generating circuit; a second capacitor connected to the current drive circuit; and a voltage boosting and rectifying circuit connected to the first and second capacitors for producing a high direct-current voltage. The voltage boosting and rectifying circuit includes a Cockcroft-Walton circuit. The current drive circuit comprises a plurality of C-MOS inverters connected in parallel with each other. The pulse generating circuit includes another current drive circuit. The high voltage generating circuit further includes a low-pass filter connected to the voltage boosting and rectifying circuit for reducing ripple components of the high direct current voltage from the voltage boosting and rectifying circuit. The low-pass filter may be connected to an avalanche-type photo diode.

BRIEF DESCRIPTION OF THE DRAWINGS

FIG. 2 shows pulse wave-forms at inputs of the Cockcroft-Walton circuit shown in FIG. 1.

DETAILED DESCRIPTION OF THE PREFERRED EMBODIMENT

Figure 1:
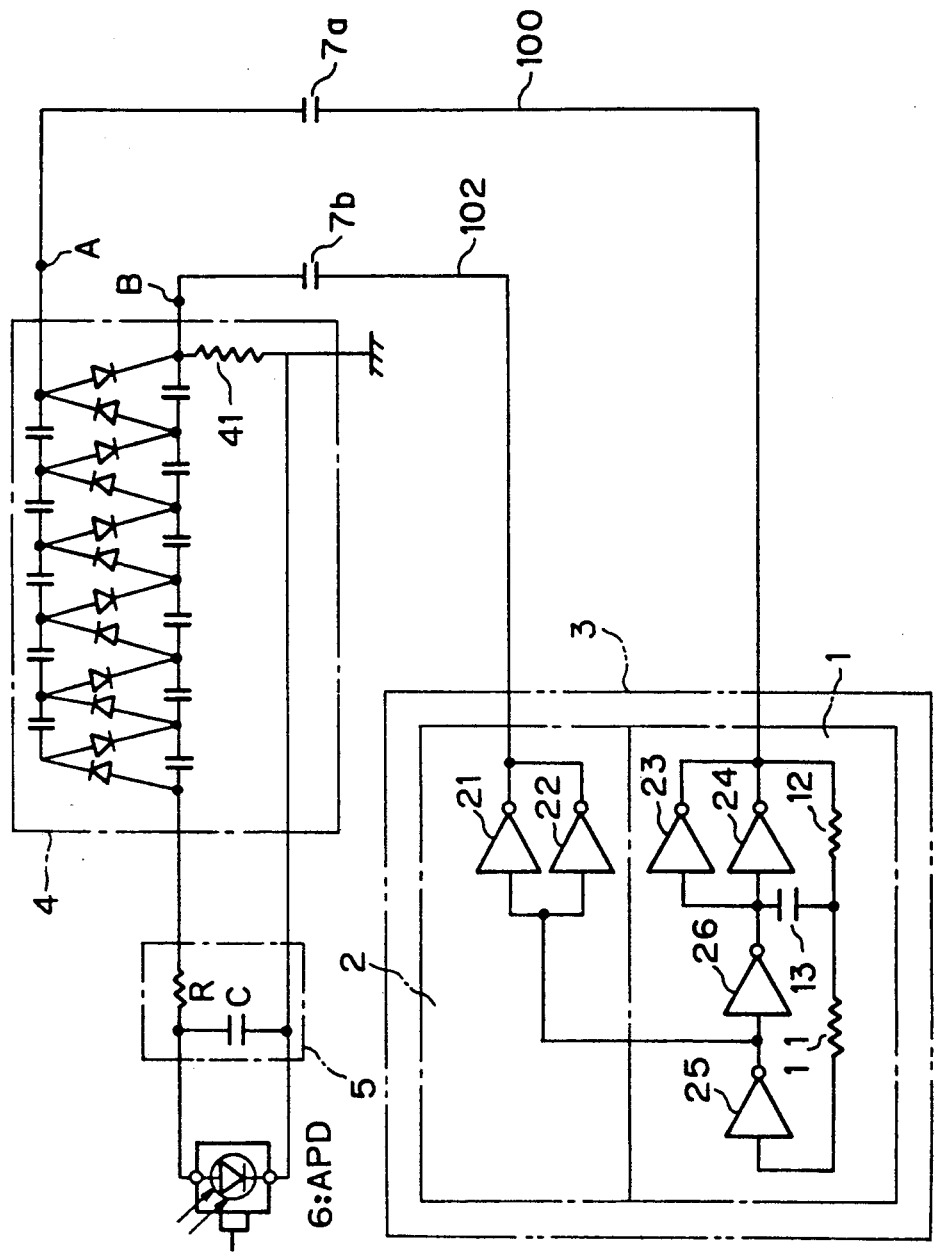
FIG. 1 shows a circuit diagram of a high-voltage generating circuit according to a preferable embodiment of this invention.

The high-voltage generating circuit according to an embodiment of the present invention will be described in FIG. 1 and FIG. 2. FIG. 1 shows a circuit diagram of the high-voltage generating circuit for providing a direct-current voltage to avalanche-type photo diode (APD) 6.

The high-voltage generating circuit comprises a current-driven pulse oscillating circuit 3, a first capacitor 7a, a second capacitor 7b, a Cockcroft-Walton circuit 4, and a low-pass filter 5.

The current-driven pulse oscillating circuit 3 is formed of a pulse oscillating or generating circuit 1 and a current drive circuit 2. The pulse oscillating circuit 1 includes C-MOS inverters 23 to 26, capacitor 13, resistors 11 and 12, and outputs a train of pulses A with a predetermined oscillation frequency to the output line 100, as shown in FIG. 2. The predetermined oscillation frequency is proportional to the time constant determined by the product of the resistor 12 and the capacitor 13. The inverters 23 and 24 act as a current drive circuit.

The current driving circuit 2 is formed of C-MOS inverters 21 and 22. The current driving circuit 2 also amplifies the output pulse of the C-MOS inverter 25, and outputs a train of repetitive pulses which is in phase opposition to the repetitive pulses from the inverter 25 in the pulse oscillating circuit 1, to the output line 102. The output pulses of both pulse oscillating circuit 1 and the current driving circuit 2 have an amplitude of 3 to 5 volts.

The capacitor $7a$ is connected between the output of the pulse oscillating circuit 1 and the input node A of the Cockcroft-Walton circuit 4. The capacitor $7b$ is connected between the output of the current drive circuit 2 and the input node B of the Cockcroft-Walton circuit 4. The capacitor $7a$ and $7b$ have a capacitance value of, for example, 0.04 to 0.05 $\mu F$.

The Cockcroft-Walton circuit 4 is formed of a resistor 41 grounding the input node B, and a plurality of boosting stages, each being formed of two diodes and two capacitors. The Cockcroft-Walton circuit 4 receives the pulses input by way of the capacitors $7a$ and $7b$ from the pulse oscillating circuit 1 and the current drive circuit 2. The capacitors used in the Cockcroft-Walton circuit 4 have a capacitance value of, for example, 0.04 to 0.05 $\mu F$.

The low-pass filter 5 is formed of a resistor R and a capacitor C, and removes the ripple components of the high direct-current voltage from the Cockcroft-Walton circuit 4.

In operation of the high-voltage generating circuit of the invention, as shown in FIG. 2, a pair of repetitive pulses which are in the opposite phase from each other are output to the input nodes A and B of the cockcroft-Walton circuit through the capacitors $7a$ and $7b$. Therefore, a pulse with an amplitude twice that of each of the pulses output from current-driven pulse oscillating circuit 3 can be applied between the nodes A and B of the Cockcroft-Walton circuit 4.

As described above, since a pulse voltage larger than that in a conventional high-voltage generating circuit is applied to the Cockcroft-Walton circuit, if a high direct-current voltage with the same amplitude is desired, the number of voltage boosting stages in the Cockcroft-Walton circuit can be decreased, for example, by half.

The high-voltage generating circuit according to the invention should not be limited to the present embodiment. It is apparent that other modifications can perform without departing from the scope of the present invention.

We claim:

1. A high-voltage generating circuit comprising:
   a pulse generating circuit for producing a first train of repetitive pulses;
   a first current drive circuit for amplifying a second train of repetitive pulses which are in phase opposition to said first train of repetitive pulses from said pulse generating circuit;
   a first capacitor having a first and second terminal, the first terminal connected to said pulse generating circuit;
   a second capacitor having a first and second terminal, the first terminal connected to said current drive circuit; and
   a voltage boosting and rectifying circuit connected to the second terminal of each of said first and second capacitors for producing a high direct-current voltage;
   wherein said pulse generating circuit comprises three inverters connected in series and a fourth inverter connected in parallel with one of said three inverters, and
   wherein said current drive circuit is connected in parallel with two of said three inverters.

2. A high-voltage generating circuit according to claim 1, wherein said voltage boosting and rectifying circuit comprises a Cockcroft-Walton circuit.

3. A high-voltage generating circuit according to claim 1, wherein said first current drive circuit comprises a plurality of CMOS inverters connected in parallel with each other.

4. A high-voltage generating circuit according to claim 1, wherein said pulse generating circuit includes a second current drive circuit.

5. A high-voltage generating circuit according to claim 1, further comprising a low-pass filter connected to said voltage boosting and rectifying circuit for reducing ripple components of the high direct current voltage from said voltage boosting and rectifying circuit.

6. A high-voltage generating circuit according to claim 1, wherein said low-pass filter circuit connected to an avalanche-type photo diode.

* * * * *